United States Patent
Hua et al.

(10) Patent No.: US 12,313,275 B2
(45) Date of Patent: May 27, 2025

(54) SYSTEM AND METHOD FOR PERSONALIZING A USER INTERFACE OF A FUME HOOD MONITOR BASED ON THE IDENTIFY OF A DETECTED USER

(71) Applicant: Honeywell International Inc., Charlotte, NC (US)

(72) Inventors: Wei Hua, Acton, MA (US); David R. Boisvert, North Chelmsford, MA (US); Robert S. Klamka, Westford, MA (US); Liwen Yu, Acton, MA (US); Aline Pamela Munoz, Mexico City (MX); James M. Barrette, Ashburnham, MA (US); Mason R. Walls, Hudson, MA (US); Greg M. Bolling, Charlotte, NC (US); Jose Jorge Figueroa Figueroa, Mexico City (MX)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/127,629

(22) Filed: Mar. 28, 2023

(65) Prior Publication Data
US 2024/0328652 A1 Oct. 3, 2024

(51) Int. Cl.
*F24F 11/52* (2018.01)
*G06F 3/0484* (2022.01)
(Continued)

(52) U.S. Cl.
CPC ......... *F24F 11/52* (2018.01); *H04M 1/72412* (2021.01); *H04W 76/10* (2018.02); *G06F 3/0484* (2013.01)

(58) Field of Classification Search
CPC .... F24F 11/52; H04M 1/72412; H04W 76/10; G06F 3/0484
See application file for complete search history.

(56) References Cited

U.S. PATENT DOCUMENTS

| | | | |
|---|---|---|---|
| 4,150,606 | A | 4/1979 | Nelson |
| 4,155,289 | A | 5/1979 | Garriss |

(Continued)

FOREIGN PATENT DOCUMENTS

| | | |
|---|---|---|
| AU | B6373090 | 5/1991 |
| CN | 105149313 A | 12/2015 |

(Continued)

OTHER PUBLICATIONS

Antec Curve Advanced Cloud Based Monitoring, Antec Controls, 4 pages, 2022.

(Continued)

*Primary Examiner* — Daniel W Parcher
(74) *Attorney, Agent, or Firm* — Seager, Tufte & Wickhem, LLP (57) ABSTRACT

A fume hood monitor includes a user interface including a display, a wireless interface and a memory that stores a plurality of fume hood parameters and one or more default display settings. A controller is configured to display one or more of the plurality of fume hood parameters on the display formatted in accordance with the default display settings. The controller is configured to detect a presence of a mobile device, and in response, receive personalized display settings from the mobile device via the wireless interface and to display one or more of the plurality of fume hood parameters on the display formatted in accordance with the personalized display settings. When the mobile device is no longer detected, the controller is configured to display one or more of the plurality of fume hood parameters on the display formatted in accordance with the default display settings.

20 Claims, 8 Drawing Sheets

(51) Int. Cl.
*H04M 1/72412* (2021.01)
*H04W 76/10* (2018.01)

(56) References Cited

U.S. PATENT DOCUMENTS

| | | |
|---|---|---|
| 4,466,341 A | 8/1984 | Grogan |
| 4,502,375 A | 3/1985 | Hignite et al. |
| 4,528,898 A | 7/1985 | Sharp et al. |
| 4,706,553 A | 11/1987 | Sharp et al. |
| 4,773,311 A | 9/1988 | Sharp |
| 4,893,551 A | 1/1990 | Sharp et al. |
| 4,934,256 A | 6/1990 | Moss et al. |
| 5,092,227 A | 3/1992 | Ahmed et al. |
| 5,115,728 A | 5/1992 | Ahmed et al. |
| 5,117,746 A | 6/1992 | Sharp |
| 5,170,673 A | 12/1992 | Ahmed et al. |
| 5,215,497 A | 6/1993 | Drees |
| 5,240,455 A | 8/1993 | Sharp |
| 5,262,578 A | 11/1993 | Hall |
| 5,385,505 A | 1/1995 | Sharp et al. |
| 5,406,073 A | 4/1995 | Sharp et al. |
| 5,439,414 A | 8/1995 | Jacob |
| 5,450,873 A | 9/1995 | Palmer |
| 5,545,086 A | 8/1996 | Sharp et al. |
| 5,562,537 A | 10/1996 | Zver et al. |
| 5,733,188 A | 3/1998 | Jacob |
| 5,882,254 A | 3/1999 | Jacob |
| 6,137,403 A | 10/2000 | Desrochers et al. |
| 6,252,689 B1 | 6/2001 | Sharp |
| 6,739,967 B2 | 5/2004 | Saito et al. |
| 6,909,921 B1 | 6/2005 | Bilger |
| 6,914,532 B2 | 7/2005 | Crooks et al. |
| 6,935,943 B2 | 8/2005 | Desai |
| 6,960,126 B2 | 11/2005 | Desai |
| 6,994,619 B2 | 2/2006 | Scholten |
| 7,532,541 B2 | 5/2009 | Govindswamy et al. |
| 7,994,480 B2 | 8/2011 | Johnson et al. |
| 9,694,398 B2 | 7/2017 | Stakutis et al. |
| 2004/0072529 A1 | 4/2004 | Desai |
| 2004/0209564 A1 | 10/2004 | Desai |
| 2005/0024216 A1 | 2/2005 | Crooks et al. |
| 2005/0048900 A1 | 3/2005 | Scholten |
| 2006/0079164 A1 | 4/2006 | DeCastro et al. |
| 2007/0065134 A1 | 3/2007 | Sugimoto |
| 2008/0065243 A1* | 3/2008 | Fallman ............ G05B 23/0267 700/83 |
| 2009/0177810 A1* | 7/2009 | Kweon ................ H04L 67/303 710/33 |
| 2009/0191803 A1 | 7/2009 | Barrette et al. |
| 2010/0265316 A1 | 10/2010 | Sali et al. |
| 2011/0137447 A1* | 6/2011 | Hermann ........... G05B 23/0251 700/108 |
| 2011/0164032 A1 | 7/2011 | Shadmi |
| 2012/0052792 A1 | 3/2012 | Sinur et al. |
| 2013/0002845 A1 | 1/2013 | Fedorenko et al. |
| 2013/0052927 A1* | 2/2013 | Broemsen ............ B08B 15/023 454/56 |
| 2013/0125233 A1* | 5/2013 | Bush .................... G05B 19/042 726/19 |
| 2013/0233411 A1* | 9/2013 | Donohue ................ F24F 11/74 137/502 |
| 2014/0028711 A1* | 1/2014 | Kincaid ................. G06F 3/013 345/633 |
| 2014/0094106 A1 | 4/2014 | McIlhany |
| 2014/0120819 A1 | 5/2014 | Stakutis et al. |
| 2014/0130574 A1* | 5/2014 | Happ .................. F24F 11/0001 73/31.01 |
| 2015/0212714 A1* | 7/2015 | Hua ..................... G05B 19/409 715/739 |
| 2016/0299577 A1* | 10/2016 | Trau ....................... G16H 50/20 |
| 2018/0299863 A1* | 10/2018 | Caine ..................... H04L 67/12 |
| 2020/0326801 A1* | 10/2020 | Nixon ................. G06F 3/04842 |
| 2021/0291242 A1* | 9/2021 | Desrochers .............. B01L 1/00 |

FOREIGN PATENT DOCUMENTS

| | | |
|---|---|---|
| CN | 109426524 A | 3/2019 |
| CN | 212821674 U | 3/2021 |
| CN | 113033316 A | 6/2021 |
| CN | 114740774 A | 7/2022 |
| DE | 10028333 A1 | 12/2001 |
| EP | 0541864 A1 | 5/1993 |
| EP | 1745866 A1 | 1/2007 |
| JP | 2004069121 A | 3/2004 |
| WO | 9113700 A1 | 9/1991 |
| WO | 9513146 A1 | 5/1995 |
| WO | 0033983 A1 | 6/2000 |

OTHER PUBLICATIONS

Apex Premier High Performance Velocity Monitor, Accutrol LLC Product Sheet, 4 pages, 2022.
Apex High Performance Velocity Alarm Accutrol LLC Product Sheet, 4 pages, 2022.
AVC Fume Hood Control System, Accutrol, LLC Product Sheet, 4 pages, 2022.
Demystifying Fume Hood Control Systems with a Simple, Intuitive User Interface, Accutrol, LLC, 5 pages, 2022.
Touchscreen FHM3, Fume Hood Monitor, Accutrol, LLC, Product Sheet, 2 pages, 2022.
Fume Hood Brochure, Confidence in Managing Laboratory Fume Hoods, Eurotherm, 8 pages, 2021.
"The Technology Behind the Microsoft xBox Motion Control System," 2 pages, Printed Sep. 1, 2011.
Hakansson et al., "Sound Focusing by Flat Acoustic Lenses without Negative Infraction," Applied Physics Letters, American institute of Physics, vol. 86, 3 pages, Downloaded Jan. 25, 2005, 054102-1, http://apl.aip.org/spl/copyright.jsp.
Holland et al., "Air Couples Acoustic Imaging with Zero-Group-Velocity Lamb Modes," Applied Physics Letters, vol. 83, No. 13, pp. 2704-2706, Sep. 29, 2003.
I.D.E.A. Prime Sense 3D Sensor, Blog Archive, 2 pages, Printed 2012.
Keegan@TI, How Mmwave Sensors Create Technology Advantages for Independent "Assisted" Living, e2@ti.com/blogs, 4 pages, Jan. 18, 2022. Accessed Mar. 3, 2023.
Low-Power, High-Sensitivty Infrared Sensor for Presence and Motion Motion Detection, Data Brief, ST Microelctronics, STHS34PF80, 13 pages, 2021.
Hood Presence Sensor ZPS-H, Accutrol, LLC Product Sheet, Oct. 2018.
Cava Manual, v105 Touchscreen Fume Hood Controller, Antec Controls, 27 pages, 2022.
MVM Manual v126, Multi-Variable Monitor, Antec Controls, 42 pages, 2022.
Pace Manual, v111, Critical Space Controller, Antec Controls,23 pages, 2022.
PMT Manual, v114, Touchscreen Room Pressure Monitor, 35 pages, 2022.
Mukhopadhyay et al., "Synthetic Aperture Sonar 3-D Imaging of Targets in Air using Multiple, non-Parallel Shot Lines," 2005 IEEE International Geoscience and Remote Sensing Symposium, vol. 1, 4 pages, Jul. 25-29, 2005 IBSN:0-7803-9050-4.
Murino, "Reconstruction and Segmentation of Underwater Acoustic Images Combining Confidence Information in MRF models," Pattern Recognition, vol. 34, pp. 981-997, 2001.
Open NI™, "Program Guide," Printed 2012, 21 pages.
Patel, "Segmentation of 3D Acoustic Images for Object Recognition Purposes," University College London,5 pages, before May 2013.
International Search Report and Written Opinion for International Application No. PCT/US2013/062991 11 pages, mailing date Dec. 26, 2013.
Phoenix Controls Corporation, "Sash Sensors," Jul. 2000.
Phoenix Controls Corporation, Laboratory Guide Specification X30 Fume Hood Monitor and Zone Presence Sensor (ZPS) 200 Series, 2 pages, Mar. 2006.

(56) References Cited

OTHER PUBLICATIONS

Phoenix Controls Corporation X30 Series Fume Hood Monitors, 13 pages, Feb. 2005.
Phoenix Controls Corporation, X30 Fume Hood Monitors, 15 pages, Jun. 2006.
Phoenix Controls Corporation, X30 Fume Hood Monitors Users Manual , 18 pages, Jun. 2006.
Scientific Equipment & Furniture Association, "Recommended Practices for Laboratory Fume Hoods," SEFA Desk Reference, Revision 1,pp. 57-135, 2006.
Siemens, Fume Hood Monitor, Technical Specification Sheet, Rev. 2, 4 pages, Apr. 2001.
Siemens Fume Hood Operating Display Panel, 12 pages, 2020.
Siemens Fume Hood Operating Display—Thin and Flush Mount, 11 pages, 2020.
"Fume Hoods", Stanford Laboratory Standard and Design, 24 pages, 2005.
Stenholt, "Stereo Rendering," Powerpoint Presentation, 45 slides, Before Jun. 2013.
Texas Instruments, 1WR6843AOP Single Chip 60 to 64 GHz mmWave Sensor Antennas-On-Package (AOP), 81 pages, Apr. 2020, Revised Jul. 2022.
Time of Flight 8x8 Multizone Ranging Sensor with Wide Field of View, VL5315Cx Datasheet, 38 pages, 2023.
Area Presence Sensor ZPS-A, Accutrol LLC Product Sheet, 2 pages, 2022.
Hood Presence Sensor, Accutrol, LLC Product Sheet, 2 pages 2022.

\* cited by examiner

FIG. 9

SYSTEM AND METHOD FOR PERSONALIZING A USER INTERFACE OF A FUME HOOD MONITOR BASED ON THE IDENTITY OF A DETECTED USER

TECHNICAL FIELD

The present disclosure relates generally to fume hoods, and more particularly to fume hoods that are configured to provide a personalized fume hood monitor display.

BACKGROUND

Fume hoods are commonly used when personnel are handling potentially harmful materials, particularly substances that give off noxious fumes. Fume hoods can often be found in educational, industrial, medical and government laboratories and production facilities. A typical fume hood may include a housing within which the harmful materials may be stored and used. Users typically access the interior of the fume hood housing through an opening, which in some cases, may be selectively opened and closed via one or more movable sashes or the like. The fume hood housing is typically vented by a ventilation device so that air and potentially harmful gases or other materials within the housing are positively exhausted out of the building through ductwork. Such venting typically draws fresh air in through the fume hood opening, which helps keep any potentially harmful materials within the fume hood and out of the space where personnel may be located.

Fume hoods typically include a fume hood monitor that is mounted to a frame or the like of the fume hood. The fume hood monitor typically includes a user interface that allows a user standing at the fume hood to view and/or set one or more parameters of the fume hood. What would be desirable is a system and method that facilitates personalizing the user interface of the fume hood monitor based on the identity of a detected user.

SUMMARY

The disclosure relates generally to fume hoods, and more particularly to fume hoods that are configured to provide a personalized fume hood monitor display. An example may be found in a fume hood monitor that is secured to a fume hood. The fume hood monitor includes a user interface including a display, a wireless interface, and a memory that stores a plurality of fume hood parameters and one or more default display settings. A controller is operatively coupled to the user interface, the wireless interface and the memory. The controller is configured to display one or more of the plurality of fume hood parameters on the display formatted in accordance with the one or more default display settings. The controller is further configured to detect a presence of a mobile device, and in response, the controller is configured to receive one or more personalized display settings from the mobile device via the wireless interface and to display one or more of the plurality of fume hood parameters on the display formatted in accordance with the one or more personalized display settings. When the presence of the mobile device is no longer detected, the controller is configured to display one or more of the plurality of fume hood parameters on the display formatted in accordance with the one or more default display settings.

Another example may be found in a method for displaying personalized information on a fume hood monitor of a fume hood. The method includes displaying one or more of a plurality of fume hood parameters on a display of the fume hood monitor formatted in accordance with one or more default display settings. The fume hood monitor detects a mobile device, and in response, the fume hood monitors establishes a wireless connection with the mobile device, wirelessly receives one or more personalized display settings from the mobile device, and displays one or more of the plurality of fume hood parameters on the display of the fume hood monitor formatted in accordance with the one or more personalized display settings. When the fume hood monitor is no longer connected to the mobile device, the fume hood monitor displays one or more of the plurality of fume hood parameters on the display of the fume hood monitor formatted in accordance with the one or more default display settings.

Another example may be found in a non-transitory computer readable medium storing instructions thereon that, when executed by one or more processors of a fume hood monitor of a fume hood, causes the one or more processors of the fume hood to display one or more of a plurality of fume hood parameters on a display of the fume hood monitor formatted in accordance with one or more default display settings. The one or more processors are caused to detect a presence of a mobile device, and in response, the one or more processors are caused to establish a wireless connection with the mobile device, wirelessly receive one or more personalized display settings from the mobile device, and display one or more of the plurality of fume hood parameters on the display of the fume hood monitor formatted in accordance with the one or more personalized display settings. When the wireless connection to the mobile device is disconnected, the one or more processors are caused to display one or more of the plurality of fume hood parameters on the display of the fume hood monitor formatted in accordance with the one or more default display settings.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several illustrative embodiments which are meant to be illustrative in nature.

Figure 1:
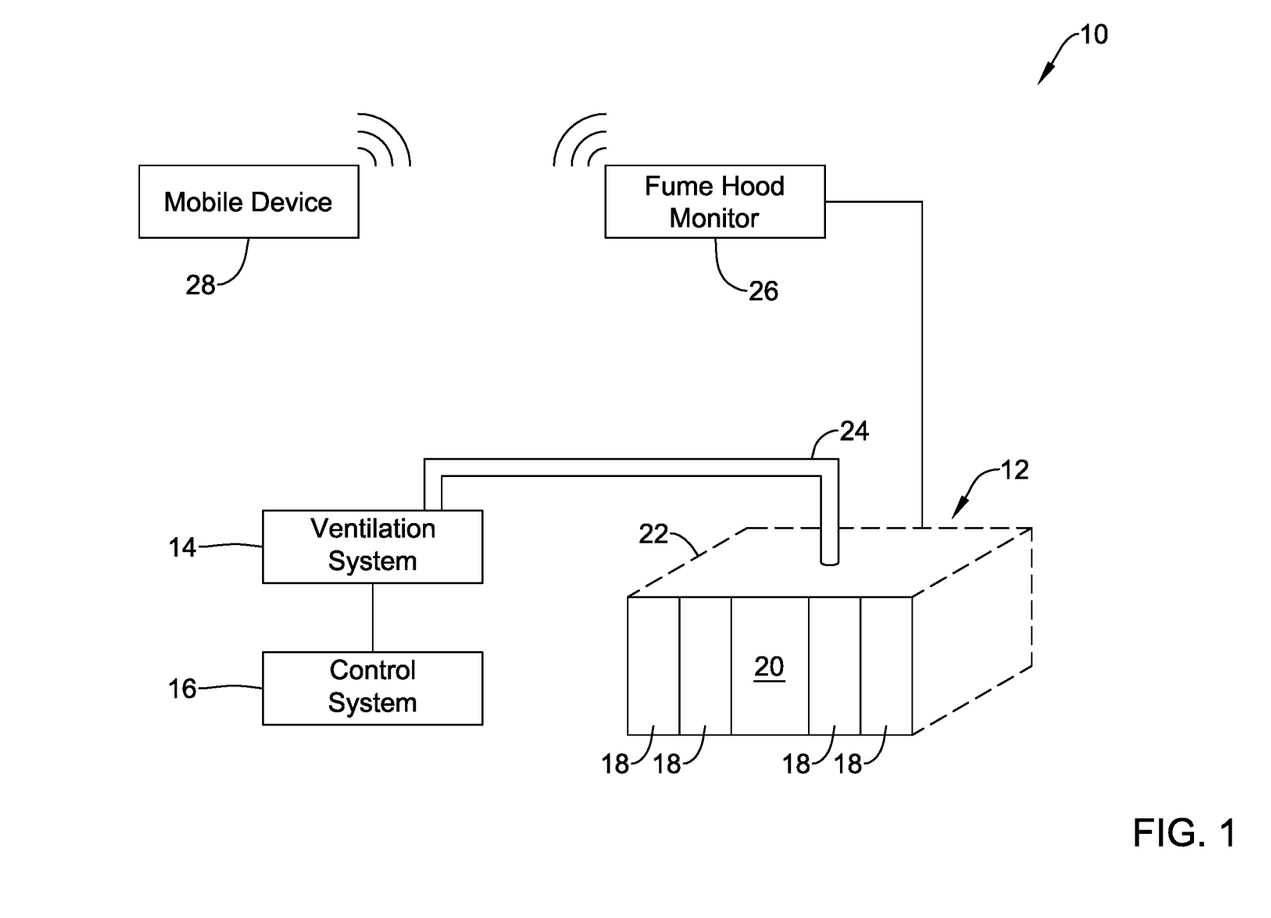
FIG. 1 is a schematic block diagram of an illustrative fume hood system.

FIG. 1 is a schematic block diagram showing an illustrative fume hood system 10. The illustrative fume hood system 10 includes a fume hood 12, a ventilation system 14 and a control system 16. In some instances, the control system 16 may control operation of the ventilation system 14. The fume hood 12 may include one or more moveable sashes 18 (a total of four are shown) that are mechanically coupled to the fume hood 12. The one or more moveable sashes 18 may be moved back and forth in order to either increase or decrease a size of an opening 20 that is formed between the one or more moveable sashes 18. In some instances, particularly when there are multiple moveable sashes 18, the moveable sashes 18 may travel within one or more tracks that are disposed at or near a front of the fume hood 12. This is just an example fume hood configuration.

The fume hood 12 may be used in, for example, educational, industrial, medical (e.g. biological safety cabinets) and/or government facilities to help facilitate handling of potentially harmful materials, particularly substances that emit noxious fumes or may include pathogens or other harmful agents. In some instances, the fume hood 12 may include a housing and/or enclosure 22 within which materials may be stored, examined, and/or used. Users may access an interior of the housing and/or enclosure 22 via the opening 20 using the movable sashes 18. To facilitate containment of the potentially harmful materials within the fume hood 12, a negative pressure may be created in the interior of the housing and/or enclosure 22 (relative to the exterior of the housing and/or enclosure 22) by the ventilation system 14 (e.g., a fan, a blower, etc.) by drawing air through the fume hood opening 20 and exhausting the air through a ductwork 24 to an exterior of the building.

Proper airflow may be desirable to prevent harmful materials from exiting the fume hood through the opening 20 and into the space where personnel may be located. In some cases, the ventilation system 14 may include a filter (e.g., a HEPA filter, a ULPA filter, etc.) or other decontamination device (e.g., a scrubber) to help remove harmful materials and/or pathogens from the exhausted air. Proper control of airflow through the fume hood opening 20 may be important for safety, economic, comfort or other reasons. For example, if airflow through the fume hood opening 20 is too low (e.g., the face velocity of air flowing through the opening is too low), contaminants inside the fume hood 12 may have an opportunity to exit the fume hood 12 through the opening 20. This may present a safety issue. However, maintaining a high volume of airflow through the fume hood opening 20 at all times may be wasteful because unnecessarily large volumes of conditioned air (e.g., cooled or heated air) in the room may be drawn into the fume hood 12 and exhausted from the building. In such cases, additional air would need to be conditioned and supplied to the room to replace the exhausted air to maintain comfort in the room. By controlling the airflow of the fume hood 12, it has been found that airflow can be maintained at a level that helps ensure safe operation of the fume hood 12, while reducing costs associated with supplying conditioned air to the building where the fume hood 12 is installed. Further, energy required to drive the ventilation system 14 (e.g. fan) may be reduced, providing additional savings. The control system 16 may control operation of the ventilation system 14 in such a way as to provide safety while minimizing energy costs, for example.

Depending on the application and/or installation, the fume hood 12 may be a bench-mounted fume hood, a floor-mounted fume hood, a portable fume hood, or any other type of fume hood. A bench-mounted fume hood may be installed such that the work surface is positioned at a standing-work height and may be used, for example, in an educational laboratory, an industrial laboratory, or a medical laboratory for limiting exposure to hazardous and/or noxious fumes, vapors, and/or dust. A floor-mounted (e.g., walk-in) fume hood may likewise be used in industrial, educational, or medical settings when large amounts of hazardous materials must be safely contained, while limiting exposure to hazardous and/or noxious fumes, vapors or dust. In some cases, a floor-mounted fume hood may be used to accommodate large amounts of hazardous material, larger equipment, and/or to facilitate access by a number of individuals. A portable fume hood may be used, for example, in settings where a permanently installed fume hood would not be practical, such as in laboratories having limited space and/or where a small containment area is needed, or for temporary or other short term use. In some instances, uses for a portable fume hood include, but are not limited to, chemical fume control, pharmaceutical compounding containment, soldering applications, light dust removal, biological applications, and other applications.

In some instances, the fume hood opening 20 is defined by one or more moveable sashes 18. The moveable sashes 18 may include panes, doors, strip curtains and/or other structure for enclosing the interior space of the fume hood 12. In some cases, the moveable sashes 18 may include a combination of panes, doors and/or strip curtains. For example, the moveable sashes 18 may be configured to open vertically, horizontally, or a combination of horizontally and vertically. In some cases, the fume hood 12 may be configured with one or more vertical moving sashes 18 and strip curtains affixed to the lower edge of the lowest vertical moving sash to allow access to the fume hood interior while still providing very significant containment. In some cases, the fume hood 12 may have two or more openings 20 defined by independently operating moveable sashes 18.

The ventilation system 14 may be configured to maintain an airflow through the fume hood 12. In some cases, the airflow may have a specified minimum airflow (e.g., when the moveable sashes 18 are fully closed), and a specified maximum airflow (e.g. when the moveable sashes 18 are fully open), such as to help ensure safe operation while reducing costs. In one example, the specified ventilation rates may be based on one or more industry standards provided by the American National Standards Institute (ANSI) and/or the American Industrial Hygiene Association (AIHA) (e.g., ANSI/AIHA Z9.5 Laboratory Ventilation), The Occupational Safety & Health Administration (OSHA) (e.g., OSHA Technical Manual, Section III: Chapter 3 Ventilation Investigation, OSHA Part 1910.1450), and/or The Scientific Equipment and Furniture Association (SEFA) (e.g., SEFA 1.2 Laboratory Fume Hoods Recommended Practices). Such standards define airflow requirements at the fume hood opening, typically specifying that the face velocities (e.g., air velocity through the fume hood opening 20) should remain within the range from about 60 feet per minute to about 125 feet per minute. Often, the recommended face velocity may depend on the relative toxicity and/or hazard of the materials within the fume hood 12 or the operations within the fume hood 12, or both.

The fume hood system 10 includes a fume hood monitor 26. In some instances, the fume hood monitor 26 may be physically mounted on a front panel of the fume hood 12. In some instances, the fume hood monitor 26 provides a display for information generated by the fume hood 12. In some instances, the fume hood monitor 26 may be configured to communicate with a mobile device 28. The mobile device 28 may be a smartphone, a smartwatch, a tablet, or any other suitable portable device. In some instances, the mobile device 28 may be configured to display information received from the fume hood monitor 26. In some instances, the mobile device 28 may be used to personalize how the user of the mobile device would like the fume hood monitor to display information when the user approaches the fume hood 12. In some cases, the user may set personalized display settings using an application running on the mobile device 28 that when communicated to the fume hood monitor 26 cause the fume hood monitor to personalize the user interface of the fume hood monitor 26 in accordance with the personalized display settings. This may include personalizing the particular information that is displayed, the format of the information that is displayed and/or the layout of the information that is displayed on the user interface of the fume hood monitor 26. These are just examples.

Figure 2:
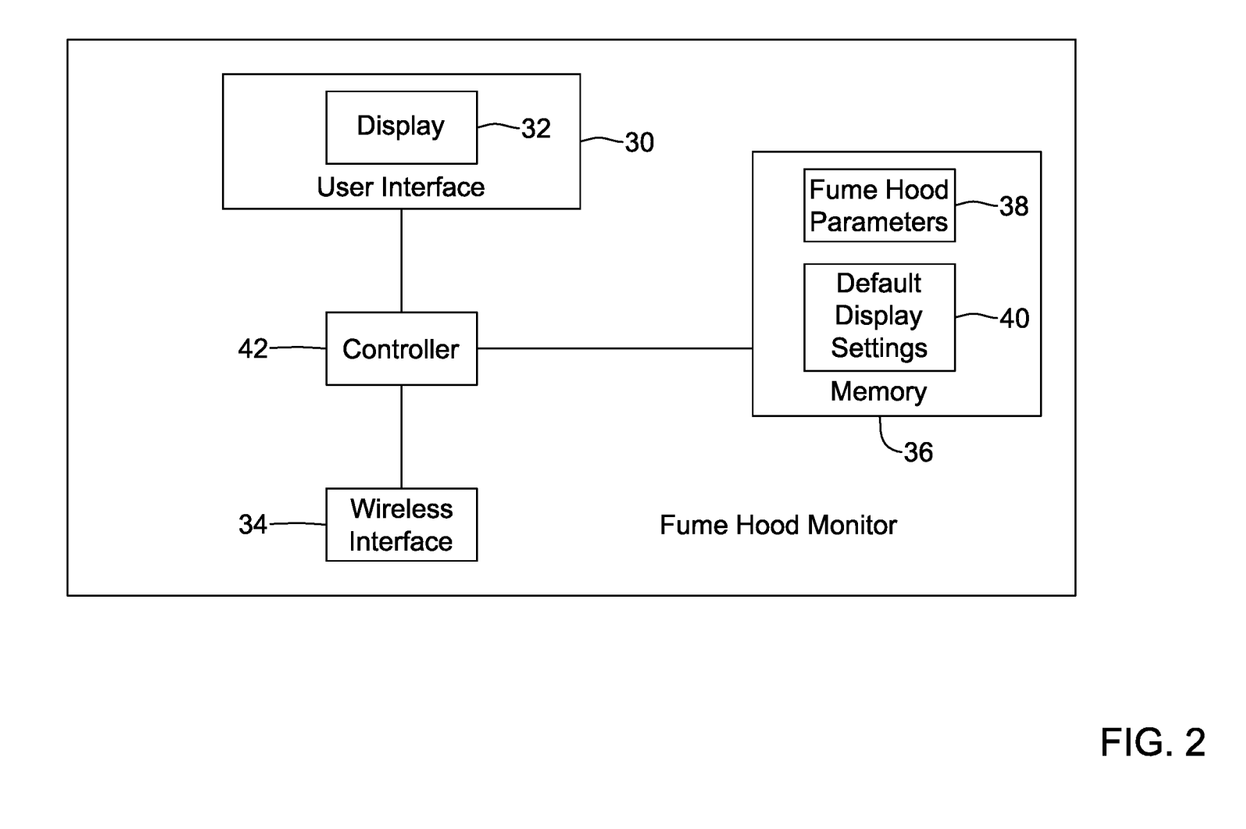
FIG. 2 is a schematic block diagram of an illustrative fume hood monitor forming a portion of the illustrative fume hood system of FIG. 1.

FIG. 2 is a schematic block diagram of the fume hood monitor 26. The fume hood monitor 26 may include a user interface 30 that includes a display 32. In some instances, the user interface 30 may include a touchscreen display. The fume hood monitor 26 includes a wireless interface 34 that may be used to communicate with other devices, such as but not limited to, the mobile device 28. The fume hood 26 includes a memory 36. In some cases, the memory 36 may store a set of fume hood parameters 38 and one or more default display settings 40. Examples of fume hood parameters 38 include but are not limited to a current face velocity of the fume hood 12, a current sash opening value, an alarm status, a timer status, a function of the fume hood monitor 26, a certification due date of the fume hood 12, and an experiment status. A controller 42 is operatively coupled to the user interface 30, the wireless interface 34 and the memory 36.

Figure 3:
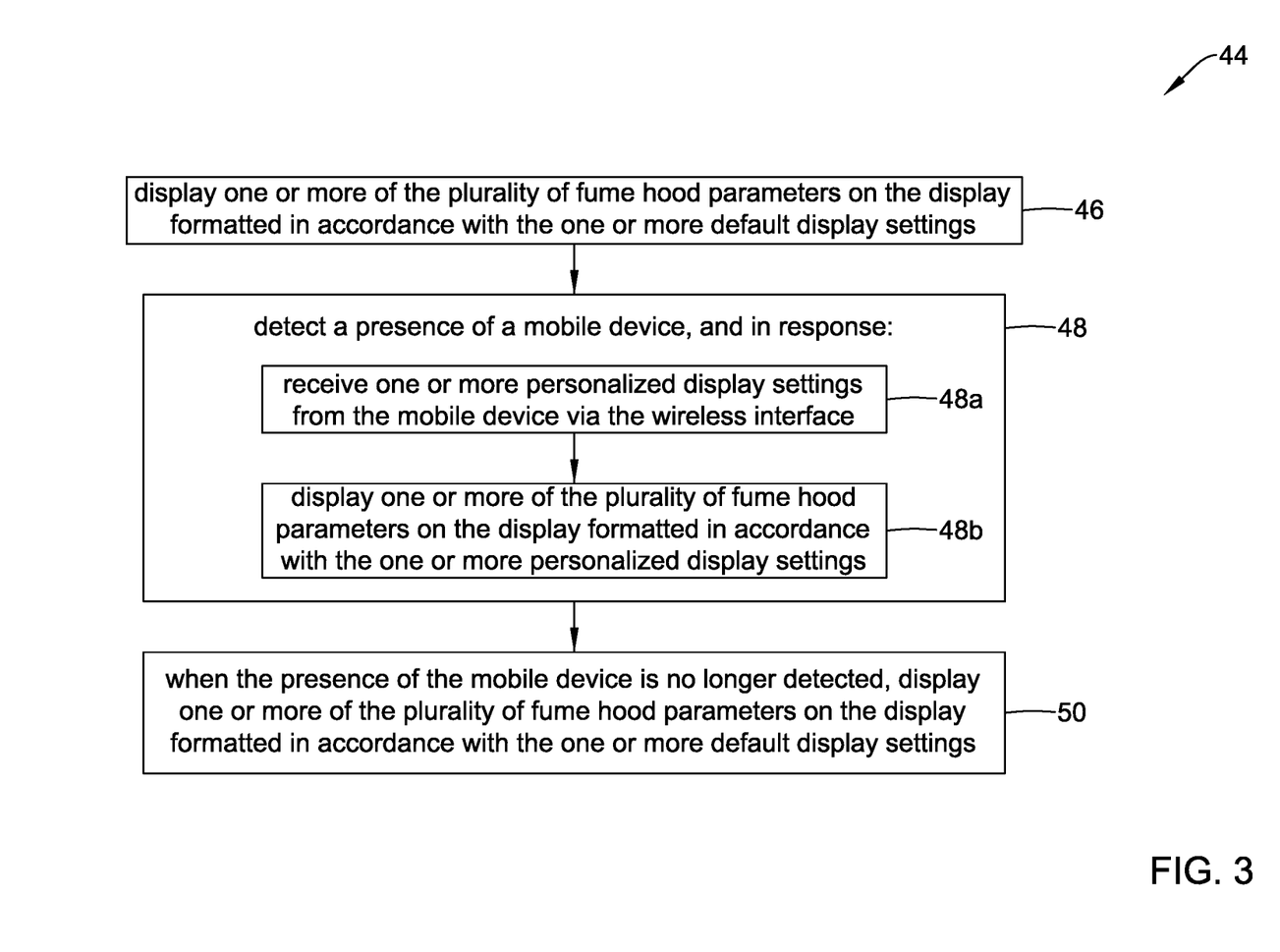
FIG. 3 is a flow diagram showing an illustrative series of steps that a controller forming part of the illustrative fume hood monitor of FIG. 2 may carry out.

FIG. 3 is a flow diagram showing an illustrative series of steps 44 that may be carried out by the controller 42 of the fume hood controller 26. The controller 42 may be configured to display one or more of the plurality of fume hood parameters on the display 32 formatted in accordance with the one or more default display settings, as indicated at block 46. The controller 42 may be configured to detect a presence of a mobile device 28, as indicated at block 48. In response, the controller 42 may be configured to receive one or more personalized display settings from the mobile device 28 via the wireless interface 34, as indicated at block 48a, and to display one or more of the plurality of fume hood parameters on the display 32 formatted in accordance with the one or more personalized display settings, as indicated at block 48b. As an example, the wireless interface may be a Bluetooth interface and/or a WIFI interface, and the mobile device 28 may be a mobile phone or a wearable device.

When the presence of the mobile device is no longer detected, the controller 42 may be configured to display one or more of the plurality of fume hood parameters on the display 32 formatted in accordance with the one or more default display settings, as indicated at block 50.

In some instances, the default display settings 40 may identify a default subset of the plurality of fume hood parameters 38 for display, wherein the default subset of the plurality of fume hood parameters does not include all of the plurality of fume hood parameters 38. In some instances, the default display settings 40 may identify a default screen layout for formatting a placement of the default subset of the plurality of fume hood parameters on the display 32. In some cases, the default display settings 40 may identify a default unit setting (e.g. imperial, metric) for one or more of the plurality of fume hood parameters, identify a default natural language setting (e.g. English, German, French, Chinese) for use on the display, and/or identify a default color scheme setting for use on the display 32, for example.

In some instances, the personalized display settings may identify a personalized subset of the plurality of fume hood parameters 38 for display, wherein the personalized subset of the plurality of fume hood parameters does not include all of the plurality of fume hood parameters 38. In some instances, the personalized subset of the plurality of fume hood parameters may not be equal to the default subset of the plurality of fume hood parameters 38. In some cases, the personalized display settings may identify a personalized screen layout for formatting a placement of the personalized subset of the plurality of fume hood parameters on the display. In some cases, the personalized display settings may identify a personalized unit setting for one or more of the plurality of fume hood parameters, or a personalized natural language setting for use on the display 32, and/or a personalized color scheme setting for use on the display 32.

In some instances, detecting the presence of the mobile device may include detecting a presence of two or more different mobile devices, and determining which of the two or more different mobile devices has a highest priority and/or selecting the mobile device of the two or more different mobile devices that has the highest priority as the mobile device. In some instances, the controller 42 may be configured to determine which of the two or more different mobile devices has the highest priority based at least in part on a signal strength of each of the two or more different mobile devices. In some instances, the controller 42 may be configured to determine which of the two or more different mobile devices has the highest priority based at least in part on a user role assigned to each of the two or more different mobile devices. In some instances, the controller 42 may be configured to determine which of the two or more different mobile devices has the highest priority based at least in part on a current location of each of the two or more different mobile devices and one or more past locations of each of the two or more different mobile devices.

Figure 4:
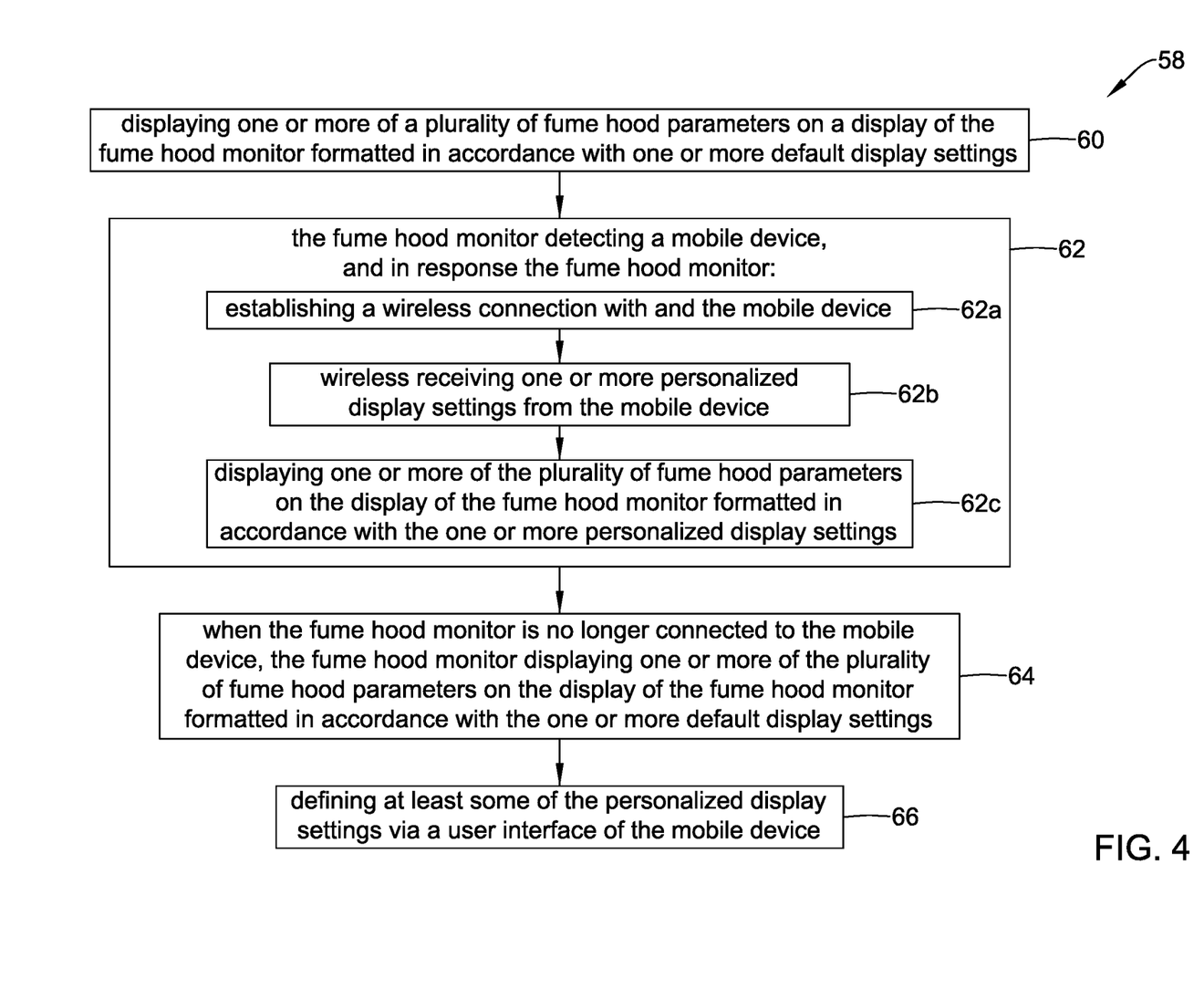
FIG. 4 is a flow diagram showing an illustrative method for displaying personalized information on the illustrative fume hood monitor of FIG. 2.

FIG. 4 is a flow diagram showing an illustrative method 58 for displaying personalized information on a fume hood monitor (such as the fume hood 26) of a fume hood (such as the fume hood 12). The method 58 includes displaying one or more of a plurality of fume hood parameters on a display of the fume hood monitor formatted in accordance with one or more default display settings, as indicated at block 60. The fume hood monitor detects a mobile device, as indicated at block 62. In response, the fume hood monitor establishes a wireless connection with and the mobile device, as indicated at block 62a. The fume hood monitor wirelessly receives one or more personalized display settings from the mobile device, as indicated at block 62b. The fume hood monitor displays one or more of the plurality of fume hood parameters on the display of the fume hood monitor formatted in accordance with the one or more personalized display settings, as indicated at block 62c. When the fume hood monitor is no longer connected to the mobile device, the fume hood monitor may display one or more of the plurality of fume hood parameters on the display of the fume hood monitor formatted in accordance with the one or more default display settings, as indicated at block 64.

In some instances, the default display settings identify a default subset of the plurality of fume hood parameters for display and the personalized display settings identify a personalized subset of the plurality of fume hood parameters for display, wherein the personalized subset of the plurality of fume hood parameters is not equal to the default subset of the plurality of fume hood parameters. In some instances, the personalized display settings identify a personalized unit setting for one or more of the plurality of fume hood parameters, a personalized natural language setting for use on the display and/or a personalized color scheme setting for use on the display. These are just examples. In some instances, the method 58 may include defining at least some of the personalized display settings via a user interface of the mobile device, as indicated at block 66. In some cases, the mobile device executes an application program that facilitates the user in defining at least some of the personalized display settings. In some cases, the personalized display settings may be stored in a memory of the mobile device.

Figure 5:
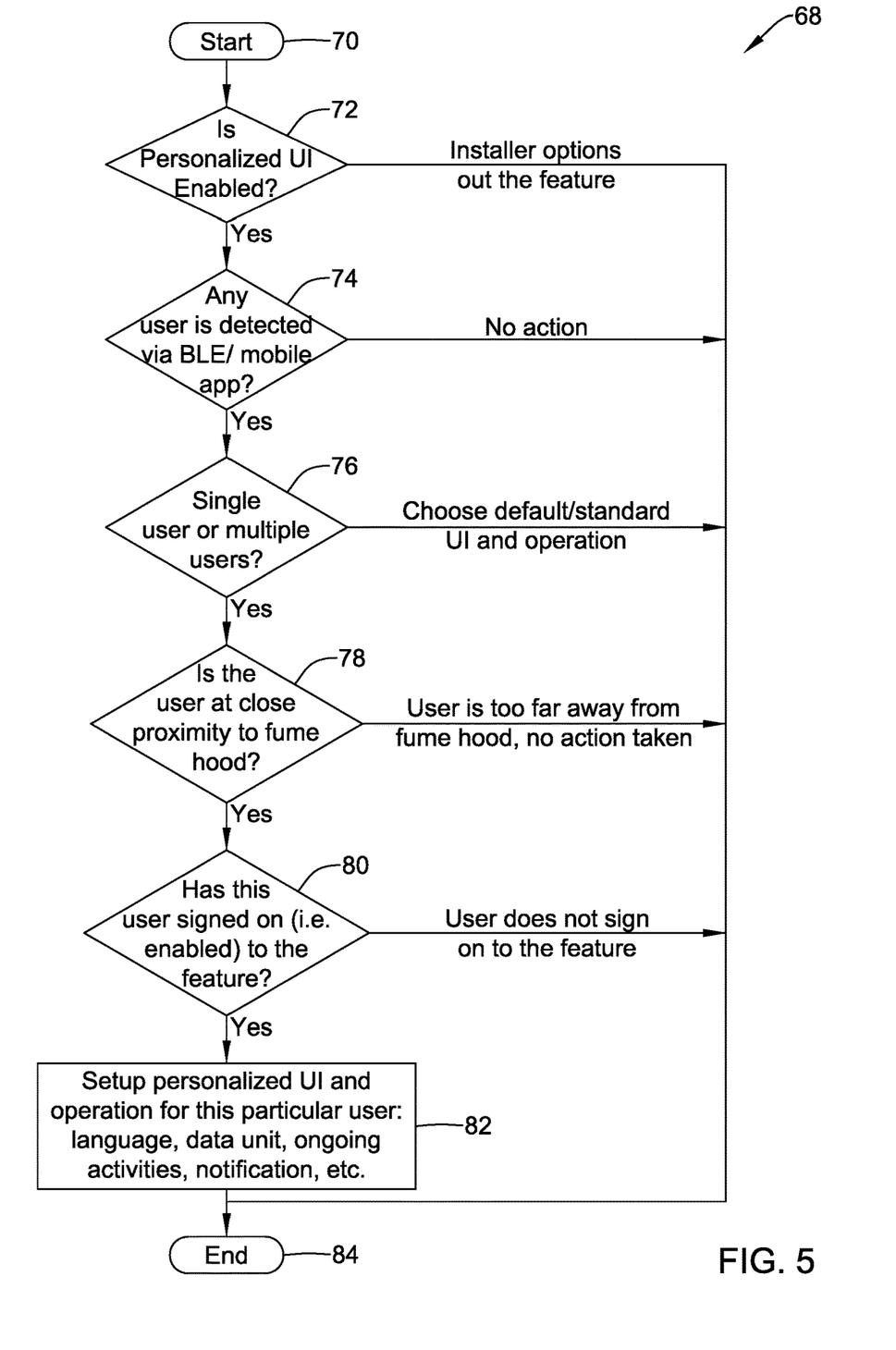
FIG. 5 is a flow diagram showing an illustrative method.

FIG. 5 is a flow diagram showing an illustrative method 68. In some instances, the method 68 may represent a decision tree for accurately detecting the user and the user's role. The method 68 begins at a start block 70. At a decision block 72, a determination is made as to whether the installer has enabled the personalized UI (user interface) option in the fume hood monitor 26. If not, default display settings are used, and control passes to an end block 84. If the personalized UI has been enabled by the installer, control passes to a decision block 74 where a determination is made as to whether any user devices are detected nearby, such as via BLE (Bluetooth Low Energy) or WiFi. In some cases, BLE or WiFi signal strength may be used to judge proximity relative to the fume hood.

If no user devices are detected, no action is taken, and default display settings are used when displaying information on the user interface of the fume hood monitor 26, and control passes to the end block 84. If, however, a user device is detected, control passes to a decision block 76. At the decision block 76, a determination is made as to whether a single user device has been detected or if multiple user devices have been detected. If multiple user devices have been detected, default display settings are used and control passes to the end block 84. If only a single user device is detected, control passes to a decision block 78. At the decision block 78, a determination is made as to whether the user is in close proximity to the fume hood. If not, the user is too far from the fume hood and no action is taken. Default display settings are used to display information on the user interface of the fume hood monitor 26, and control passes to an end block 84. If the user is in close proximity to the fume hood, control passes to a decision block 80, where a determination is made as whether the user has signed in (i.e., enabled) the feature of personalizing the user interface of the fume hood monitor 26. If not, default display settings are used to display information on the user interface of the fume hood monitor 26, and control passes to the end block 84. However, if the user has signed in (i.e., enabled) the feature of personalizing the user interface of the fume hood monitor 26, control passes to block 82 where personalized display settings from the user's mobile device are used to display information on the user interface of the fume hood monitor 26.

Returning to decision block 76, if multiple user devices are detected, and rather than using default display settings, the fume hood monitor may determine which of the multiple detected user devices has the highest priority, and use personalized display settings of the mobile device with the highest priority to personalize the user interface of the fume hood monitor 26. The highest priority may be determined by, for example, the role assigned to the user of the mobile device, the distance that each of the mobile devices is from the fume hood, and/or any other suitable criteria.

Figure 6:
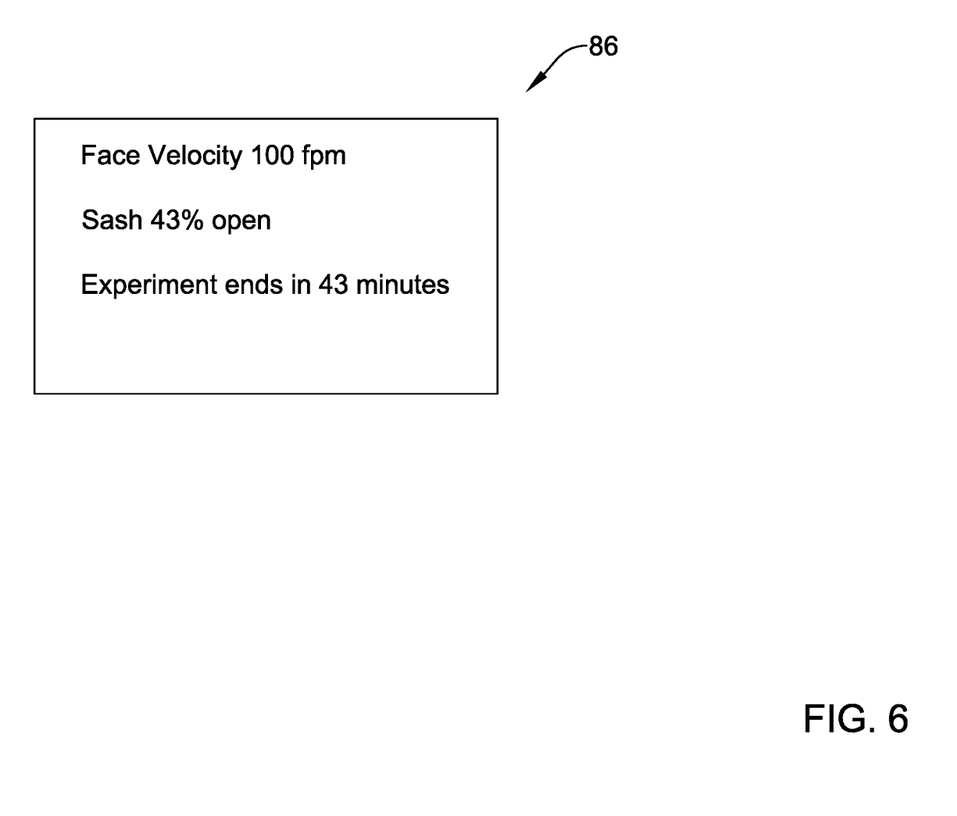
FIGS. 6 through 10 are schematic diagrams showing illustrative screens that may be displayed by the illustrative fume hood monitor of FIG. 2.

FIG. 6 is a schematic example of an illustrative screen 86 that may be displayed on the display 32 of the fume hood monitor 26 when default display settings are used. As shown, the screen 86 shows the current face velocity, the current sash open position and information regarding when the current experiment will end. While the screen 86 is shown as being in the English language, it will be appreciated that the default display settings may select any suitable language. Any of a variety of layouts, fonts and display colors may be chosen as default display settings, for example. Also, any set or subset of fume hood parameters may be selected for display as default display settings.

Figure 7:
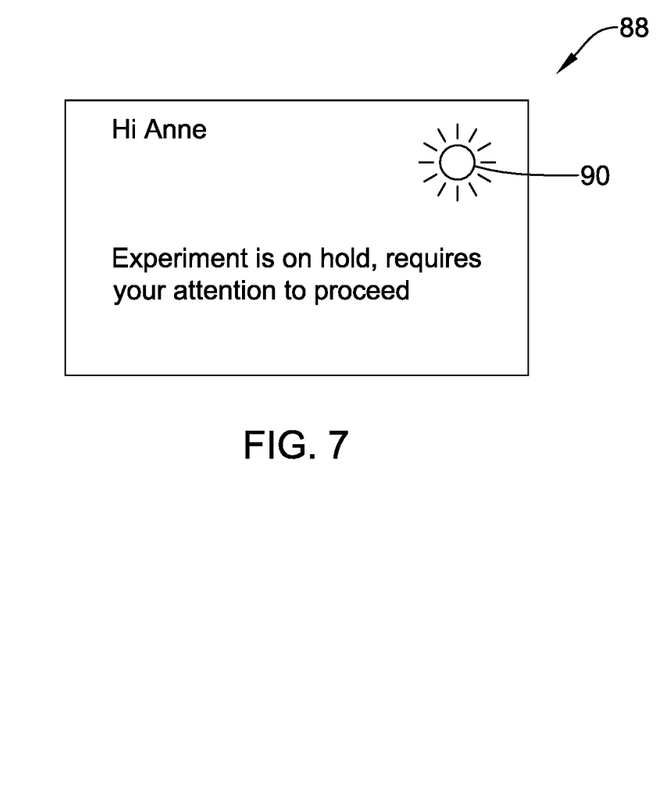

FIG. 7 is a schematic example of an illustrative screen 88 that may be displayed on the display 32 of the fume hood monitor 26 when personalized display settings are used. As shown, the screen 88 identifies the user and provides a message that attention to the user's experiment is needed. In some instances, as shown, the screen 88 may include an icon 90 that provides a visual warning. While the screen 88 is shown as being in English, it will be appreciated that depending on the personalized display settings of the mobile device 28, a different language may be used. Any of a variety of layouts, fonts and display colors may be chosen as personalized display settings, for example. Also, any set or subset of fume hood parameters may be selected for display as personalized display settings. In some cases, if the fume hood monitor 26 includes a speaker, the fume hood monitor 26 may read the text out loud for the person to understand.

Figure 8:
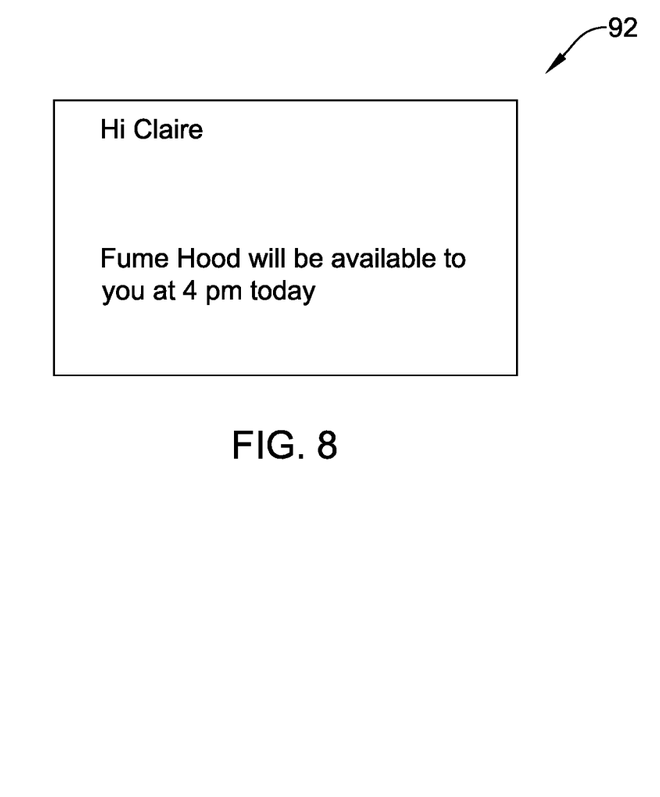

FIG. 8 is a schematic example of an illustrative screen 92 that may be displayed on the display 32 of the fume hood monitor 26 when personalized display settings are used. As shown, the screen 92 identifies the user and provides a message that the fume hood will be available that afternoon at 4 pm. While the screen 92 is shown as being in English, it will be appreciated that depending on the personalized display settings of the mobile device 28, a different language may be used. Any of a variety of layouts, fonts and display colors may be chosen as personalized display settings, for example. Also, any set or subset of fume hood parameters may be selected for display as personalized display settings. In some cases, if the fume hood monitor 26 includes a speaker, the fume hood monitor 26 may read the text out loud for the person to understand.

Figure 9:
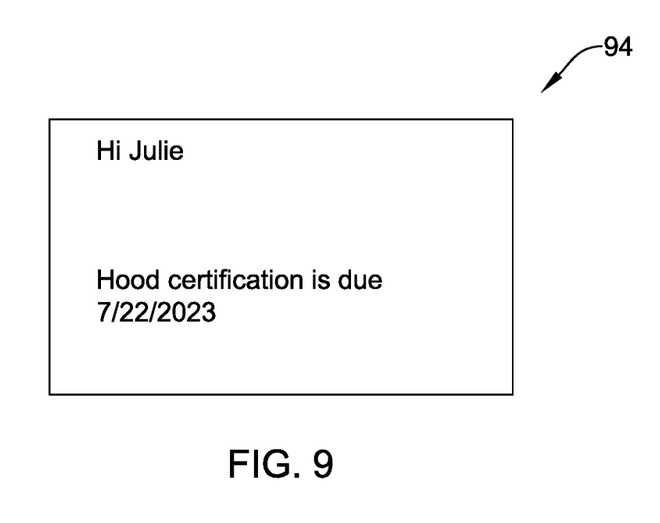

FIG. 9 is a schematic example of an illustrative screen 94 that may be displayed on the display 32 of the fume hood monitor 26 when personalized display settings are used. As shown, the screen 94 identifies the user and provides a message that hood certification will be needed. While the screen 94 is shown as being in English, it will be appreciated that depending on the personalized display settings of the mobile device 28, a different language may be used. Any of a variety of layouts, fonts and display colors may be chosen as personalized display settings, for example. Also, any set or subset of fume hood parameters may be selected for display as personalized display settings. In some cases, if the fume hood monitor 26 includes a speaker, the fume hood monitor 26 may read the text out loud for the person to understand.

Figure 10:
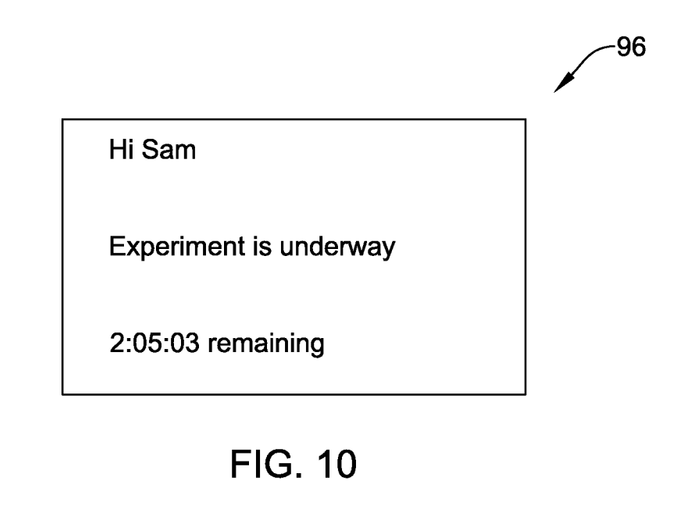

FIG. 10 is a schematic example of an illustrative screen 96 that may be displayed on the display 32 of the fume hood monitor 26 when personalized display settings are used. As shown, the screen 96 identifies the user and provides a message that the experiment is underway, and provides a timer. While the screen 96 is shown as being in English, it will be appreciated that depending on the personalized display settings of the mobile device 28, a different language may be used. Any of a variety of layouts, fonts and display colors may be chosen as personalized display settings, for example. Also, any set or subset of fume hood parameters may be selected for display as personalized display settings. In some cases, if the fume hood monitor 26 includes a speaker, the fume hood monitor 26 may read the text out loud for the person to understand.

Having thus described several illustrative embodiments of the present disclosure, those of skill in the art will readily appreciate that yet other embodiments may be made and used within the scope of the claims hereto attached.

What is claimed is:

1. A fume hood monitor secured to a fume hood, the fume hood monitor comprising:
 a user interface including a display;
 a wireless interface;
 a memory storing:
  a plurality of fume hood parameters;
  one or more default display settings;
 a controller operatively coupled to the user interface, the wireless interface and the memory, the controller configured to:
  display one or more of the plurality of fume hood parameters on the display in accordance with the one or more default display settings;
  detect whether a mobile device is present, and in response to detecting a mobile device is present:
   receive one or more personalized display settings from the mobile device via the wireless interface to personalize how the user of the mobile device would like the fume hood monitor to display information when the user approaches the fume hood;
  in response to receiving one or more personalized display settings from the mobile device, display one or more of the plurality of fume hood parameters on the display in accordance with the one or more of the default display settings stored in the memory of the fume hood monitor and one or more of the plurality of fume hood parameters in accordance with one or more of the personalized display settings; and
  in response to detecting that no mobile device is present, returning to display the one or more of the plurality of fume hood parameters on the display in accordance with the one or more default display settings and ceasing to display the one or more of the plurality of fume hood parameters in accordance with the one or more personalized display settings.

2. The fume hood monitor of claim 1, wherein the default display settings identify a default subset of the plurality of fume hood parameters for display, wherein the default subset of the plurality of fume hood parameters does not include all of the plurality of fume hood parameters.

3. The fume hood monitor of claim 2, wherein the default display settings identify a default screen layout for a placement of the default subset of the plurality of fume hood parameters on the display.

4. The fume hood monitor of claim 2, wherein the default display settings:
 identify a default unit setting for one or more of the plurality of fume hood parameters;
 identify a default natural language setting for use on the display; and/or
 identify a default color scheme setting for use on the display.

5. The fume hood monitor of claim 2, wherein the personalized display settings identify a personalized subset of the plurality of fume hood parameters for display, wherein the personalized subset of the plurality of fume hood parameters does not include all of the plurality of fume hood parameters.

6. The fume hood monitor of claim 5, wherein the personalized subset of the plurality of fume hood parameters is not equal to the default subset of the plurality of fume hood parameters.

7. The fume hood monitor of claim 5, wherein the one or more personalized display settings identify a personalized screen layout for a personalized placement of the personalized subset of the plurality of fume hood parameters on the display.

8. The fume hood monitor of claim 5, wherein the one or more personalized display settings:
 identify a personalized unit setting for one or more of the plurality of fume hood parameters;
 a personalized language setting for use on the display of the fume hood monitor; and/or
 a personalized color scheme setting for use on the display of the fume hood monitor.

9. The fume hood monitor of claim 1, wherein the plurality of fume hood parameters comprise one or more of:
 a current face velocity of the fume hood;
 a current sash opening value;
 an alarm status;
 a timer status;
 a function of the fume hood monitor;
 a certification due date of the fume hood; and
 an experiment status.

10. The fume hood monitor of claim 1, wherein detecting whether a mobile device is present comprises:
 detect whether two or more different mobile devices are present;
 determine which of the two or more different mobile devices has a highest priority; and
 select the mobile device of the two or more different mobile devices that has the highest priority as the mobile device.

11. The fume hood monitor of claim 10, wherein the controller is configured to determine which of the two or more different mobile devices has the highest priority based at least in part on a signal strength of each of the two or more different mobile devices.

12. The fume hood monitor of claim 10, wherein the controller is configured to determine which of the two or more different mobile devices has the highest priority based at least in part on a user role assigned to each of the two or more different mobile devices.

13. The fume hood monitor of claim 10, wherein the controller is configured to determine which of the two or more different mobile devices has the highest priority based at least in part on a current location of each of the two or more different mobile devices and one or more past locations of each of the two or more different mobile devices.

14. The fume hood monitor of claim 1, wherein the mobile device is a mobile phone or a wearable device.

15. A method for displaying personalized information on a fume hood monitor of a fume hood, the method comprising:
  displaying one or more of a plurality of fume hood parameters on a display of the fume hood monitor in accordance with one or more default display settings stored in a memory of the fume hood monitor;
  the fume hood monitor detecting whether a mobile device is present, and in response to detecting a mobile device is present, the fume hood monitor:
    establishing a wireless connection with the mobile device;
    wirelessly receiving one or more personalized display settings from the mobile device, wherein at least one of the one or more personalized display settings is set by a user of the mobile device to personalize how the user of the mobile device would like the fume hood monitor to display information when the user approaches the fume hood;
    displaying one or more of the plurality of fume hood parameters on the display in accordance with one or more of the default display settings stored in the memory of the fume hood monitor and one or more of the plurality of fume hood parameters in accordance with the one or more of the personalized display settings; and
  in response to detecting that no mobile device is present, the fume hood monitor displaying one or more of the plurality of fume hood parameters on the display of the fume hood monitor in accordance with the one or more default display settings and ceasing to display the one or more of the plurality of fume hood parameters in accordance with the one or more personalized display settings.

16. The method of claim 15, wherein:
  the default display settings identify a default subset of the plurality of fume hood parameters for display; and
  the one or more personalized display settings identify a personalized subset of the plurality of fume hood parameters for display, wherein the personalized subset of the plurality of fume hood parameters is not equal to the default subset of the plurality of fume hood parameters.

17. The fume hood monitor of claim 16, wherein the one or more personalized display settings:
  identify a personalized unit setting for one or more of the plurality of fume hood parameters;
  a personalized language setting for use on the display of the fume hood monitor; and/or
  a personalized color scheme setting for use on the display of the fume hood monitor.

18. The method of claim 15, further comprising setting at least some of the one or more personalized display settings by the user of the mobile device via a user interface of the mobile device.

19. The method of claim 15, storing the personalized display settings in a memory of the mobile device.

20. A non-transitory computer readable medium storing instructions thereon that, when executed by one or more processors of a fume hood monitor of a fume hood, causes the one or more processors of the fume hood to:
  display one or more of a plurality of fume hood parameters on a display of the fume hood monitor in accordance with one or more default display settings stored in a memory of the fume hood monitor;
  detect whether two or more different mobile devices are concurrently present, and in response to detecting two or more different mobile devices are concurrently present:
    determine which of the two or more different mobile devices has a highest priority based at least in part on one or more of:
      a signal strength of each of the two or more different mobile devices;
      a current location of each of the two or more different mobile devices and one or more past locations of each of the two or more different mobile devices;
    select the mobile device of the two or more different mobile devices that has the highest priority as a selected mobile device;
    wirelessly receive one or more personalized display settings from the selected mobile device;
    display one or more of the plurality of fume hood parameters on the display in accordance with one or more of the default display settings stored in the memory of the fume hood monitor and one or more of the plurality of fume hood parameters on the display of the fume hood monitor in accordance with the one or more of the personalized display settings received from the selected mobile device; and
  in response to detecting that no mobile device is present, returning to display one or more of the plurality of fume hood parameters on the display of the fume hood monitor in accordance with the one or more default display settings and ceasing to display the one or more of the plurality of fume hood parameters in accordance with the one or more personalized display settings.

\* \* \* \* \*

UNITED STATES PATENT AND TRADEMARK OFFICE
CERTIFICATE OF CORRECTION

| | | |
|---|---|---|
| PATENT NO. | : 12,313,275 B2 | Page 1 of 1 |
| APPLICATION NO. | : 18/127629 | |
| DATED | : May 27, 2025 | |
| INVENTOR(S) | : Hua et al. | |

It is certified that error appears in the above-identified patent and that said Letters Patent is hereby corrected as shown below:

On the Title Page

Item (54) and in the Specification, Column 1, Line 4, In the Title after "HOOD MONITOR BASED ON THE", delete "IDENTIFY" and insert therefor --IDENTITY--.

Signed and Sealed this
Eighth Day of July, 2025

Coke Morgan Stewart
*Acting Director of the United States Patent and Trademark Office*